United States Patent [19]
Matthews et al.

[11] Patent Number: 5,516,136
[45] Date of Patent: May 14, 1996

[54] APPARATUS FOR THE COUPLING OF LINES BETWEEN A TRACTOR AND A TRAILER

[76] Inventors: Peter L. Matthews; Diane D. Matthews, both of 27 Ridge Rd., Halifax, Mass. 02338-1119

[21] Appl. No.: 285,114

[22] Filed: Aug. 3, 1994

[51] Int. Cl.⁶ ......................................................... B60D 1/62
[52] U.S. Cl. .............................. 280/422; 439/35; 439/341
[58] Field of Search ..................................... 280/422, 420, 280/421; 191/11; 439/34, 35, 907, 341, 376, 374

[56] References Cited

U.S. PATENT DOCUMENTS

| 2,070,837 | 5/1935 | Johnson | 280/422 |
| 2,542,404 | 2/1951 | Ensign | 439/341 |
| 4,842,532 | 6/1989 | Krause | 439/35 |
| 4,869,681 | 9/1989 | Vache et al. | 439/341 |
| 4,905,938 | 3/1990 | Braccio et al. | 439/374 |
| 5,148,353 | 7/1992 | Morgan et al. | 439/341 |
| 5,215,471 | 6/1993 | Reymond et al. | 439/341 |

FOREIGN PATENT DOCUMENTS 0315685  10/1956  Switzerland ........................... 280/421

Primary Examiner—Anne Marie Boehler
Attorney, Agent, or Firm—John P. McGonagle

[57] ABSTRACT

An apparatus for the coupling of lines between a tractor and a trailer comprises a tractor plate formed in a generally rectangular configuration with parallel side edges extending vertically and with a lower edge having a downwardly extending tongue and an upwardly extending enlarged head. The tractor plate further comprises vertically aligned apertures. A trailer plate in a generally rectangular configuration has vertically extending parallel side edges and generally parallel upper and lower edges, flanges extending forwardly from the side edges thereof adapted to receive the side edges of the tractor plate, and further includes an enlargement with a recess at its lower edge adapted to receive the tongue of the tractor plate for the support thereof. The flanges of the trailer plate have apertures at the upper edge thereof with a pivot pin extending therethrough. A retainer block supported by the pivot pin is adapted to receive and support the head at the upper edge of the tractor plate during operation and use. Finally, springs are secured to the retainer block of the trailer plate adapted to hold the head and its associated tractor plate in position during operation and use.

4 Claims, 4 Drawing Sheets

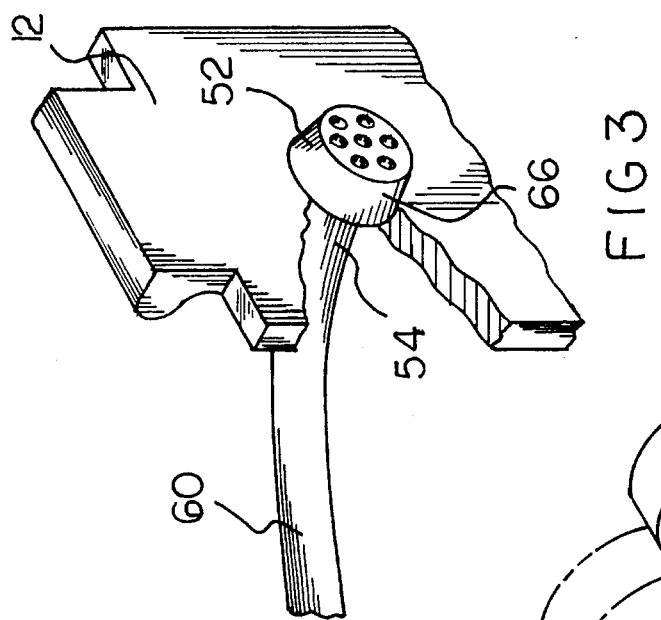
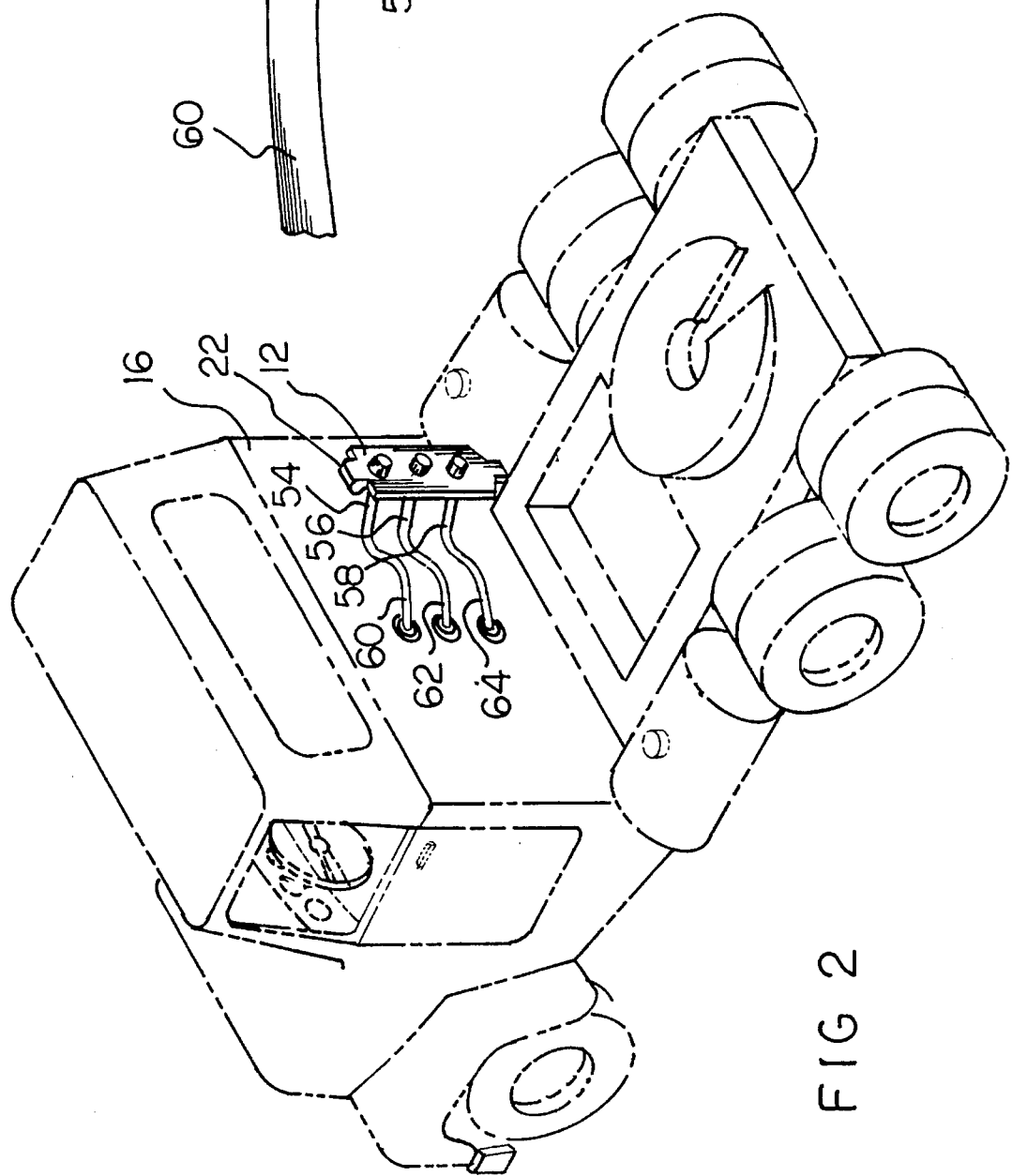

APPARATUS FOR THE COUPLING OF LINES BETWEEN A TRACTOR AND A TRAILER

BACKGROUND OF THE INVENTION

1. Field of the Invention

The present invention relates to an apparatus for the coupling of lines between a tractor and a trailer and more particularly pertains to coupling lines between a tractor and a trailer in a safe, rapid, convenient manner.

2. Description of the Prior Art

The use of a wide variety of designs and configurations for coupling various types of lines, electrical and pneumatic, between two components of a system is known in the prior art. More specifically, a wide variety of designs and configurations for coupling various types of lines, electrical and pneumatic between two components of a system heretofore devised through a wide variety of methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,887,256 a tractor-trailer electrical connector.

U.S. Pat. No. 4,072,381 discloses a tractor-trailer electrical connector system.

U.S. Pat. No. 4,400,005 discloses a tractor-trailer connector means with retractable coupling pins.

U.S. Pat. No. 4,711,510 discloses an electrical connector for tractor-trailer rig.

U.S. Pat. No. 5,224,874 discloses a connector plug.

In this respect, the apparatus for the coupling of lines between a tractor and a trailer according to the present invention substantially departs from the conventional concepts and designs of the prior art, and in doing so provides an apparatus primarily developed for the purpose of coupling lines between a tractor and a trailer in a safe, rapid, convenient manner.

Therefore, it can be appreciated that there exists a continuing need for a new and improved apparatus for the coupling of lines between a tractor and a trailer which can be used for coupling lines between a tractor and a trailer in a safe, rapid, convenient manner. In this regard, the present invention substantially fulfills this need.

SUMMARY OF THE INVENTION

In view of the foregoing disadvantages inherent in the known types of a wide variety of designs and configurations for coupling various types of lines, electrical and pneumatic between two components of a system now present in the prior art, the present invention provides an improved apparatus for the coupling of lines between a tractor and a trailer. As such, the general purpose of the present invention, which will be described subsequently in greater detail, is to provide a new and improved apparatus for the coupling of lines between a tractor and a trailer and method which has all the advantages of the prior art and none of the disadvantages.

To attain this, the present invention essentially comprises a new and improved apparatus for the coupling of lines between a tractor and a trailer that comprises a tractor plate formed in a generally rectangular configuration with parallel side edges extending vertically and with a lower edge having a downwardly extending tongue and an upwardly extending enlarged head and three vertically aligned apertures formed in the tractor plate. The invention also includes a trailer plate in a generally rectangular configuration having vertically extending parallel side edges and generally parallel upper and lower edges and flanges, extending forwardly from the side edges thereof adapted to receive the side edges of the tractor plate. The trailer plate also includes an enlargement with a recess at its lower edge adapted to receive the tongue of the tractor plate for the support thereof. The flanges of the trailer plate have apertures at the upper edge thereof with a pivot pin extending therethrough for a retainer block to be supported by the pivot pin which is adapted to receive and support the head at the upper edge of the tractor plate during operation and use and further including springs secured to the retainer block of the trailer plate adapted to hold the head and its associated tractor plate in position. The invention further includes fittings to hold the rearward edge of an electrical line, emergency line and service line of a tractor in position in the tractor plate with frusto-conically shaped exterior surfaces extending from the rear surface of the tractor plate and fittings for lines of the trailer plate including frusto-conically shaped apertures for the receipt of the frusto-conically shaped projections of the tractor plate whereby when the tractor plate is releasably coupled to the trailer plate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus for the coupling of lines between a tractor and a trailer which has all the advantages of the prior art a wide variety of designs and configurations for coupling various types of lines, electrical and pneumatic between two components of a system and none of the disadvantages.

It is another object of the present invention to provide a new and improved apparatus for the coupling of lines between a tractor and a trailer which may be easily and efficiently manufactured and marketed.

It is further object of the present invention to provide a new and improved apparatus for the coupling of lines between a tractor and a trailer which is of durable and reliable constructions.

An even further object of the present invention is to provide a new and improved apparatus for the coupling of lines between a tractor and a trailer which is susceptible of a low cost of manufacture with regard to both materials and labor, and which accordingly is then susceptible of low prices of sale to the consuming public, thereby making such apparatus for the coupling of lines between a tractor and a trailer economically available to the buying public.

Still yet another object of the present invention is to provide a new and improved apparatus for the coupling of lines between a tractor and a trailer which provides in the apparatuses and methods of the prior art some of the advantages thereof, while simultaneously overcoming some of the disadvantages normally associated therewith.

Still another object of the present invention is to couple lines between a tractor and a trailer in a safe, rapid, convenient manner.

Lastly, it is an object of the present invention to provide a new and improved an apparatus for the coupling of lines between a tractor and a trailer comprising an apparatus for the coupling of lines between a tractor and a trailer comprising a tractor plate formed in a generally rectangular configuration with parallel side edges extending vertically and with a lower edge having a downwardly extending tongue and an upwardly extending enlarged head; three vertically aligned apertures formed in the tractor plate; a trailer plate in a generally rectangular configuration having vertically extending parallel side edges and generally parallel upper and lower edges, flanges extending forwardly from the side edges thereof adapted to receive the side edges of the tractor plate, the trailer plate also including an enlargement with a recess at its lower edge adapted to receive the tongue of the tractor plate for the support thereof, the flanges of the trailer plate having apertures at the upper edge thereof with a pivot pin extending therethrough, a retainer block supported by the pivot pin adapted to receive and support the head at the upper edge of the tractor plate during operation and use; and springs secured to the retainer block of the trailer plate adapted to hold the head and its associated tractor plate in position during operation and use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an enlarged perspective illustration of the tractor shown in FIG. 1 with the various electrical and pneumatic lines extending therefrom and employing the coupling plate of the present invention.

FIG. 3 is an enlarged perspective view of the electrical line shown in FIG. 2 with parts removed to show certain internal constructions thereof.

The same reference numerals refer to the same parts through the various Figures.

DESCRIPTION OF THE PREFERRED EMBODIMENT

Figure 1:
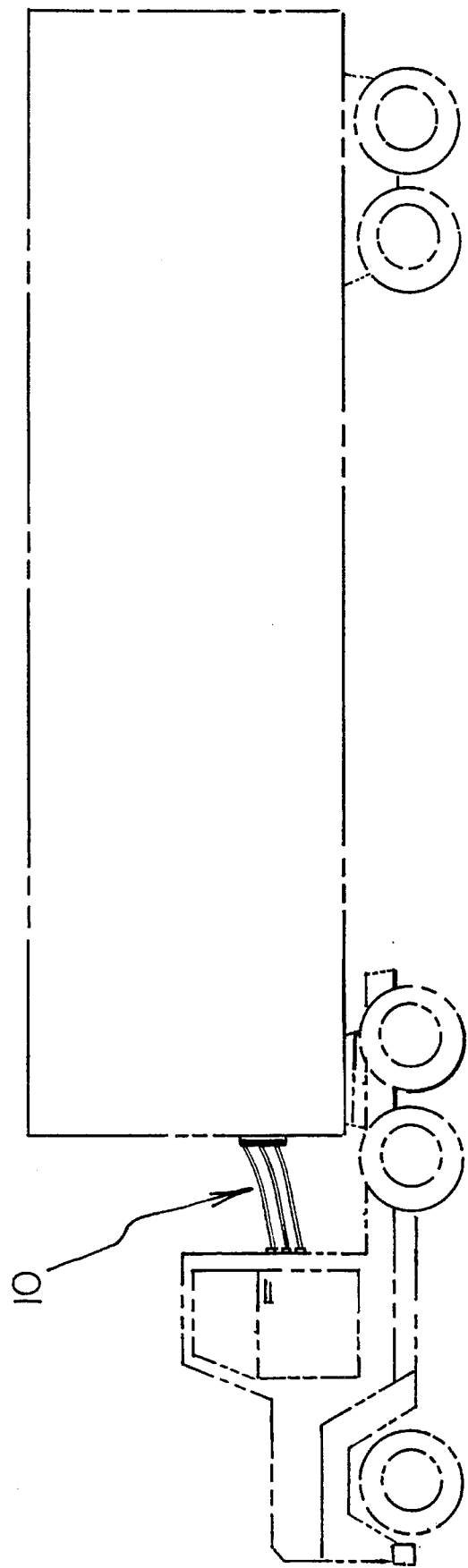
FIG. 1 is a side elevational view of the preferred embodiment of the apparatus for the coupling of lines between a tractor and a trailer constructed in accordance with the principles of the present invention.
Figure 4:
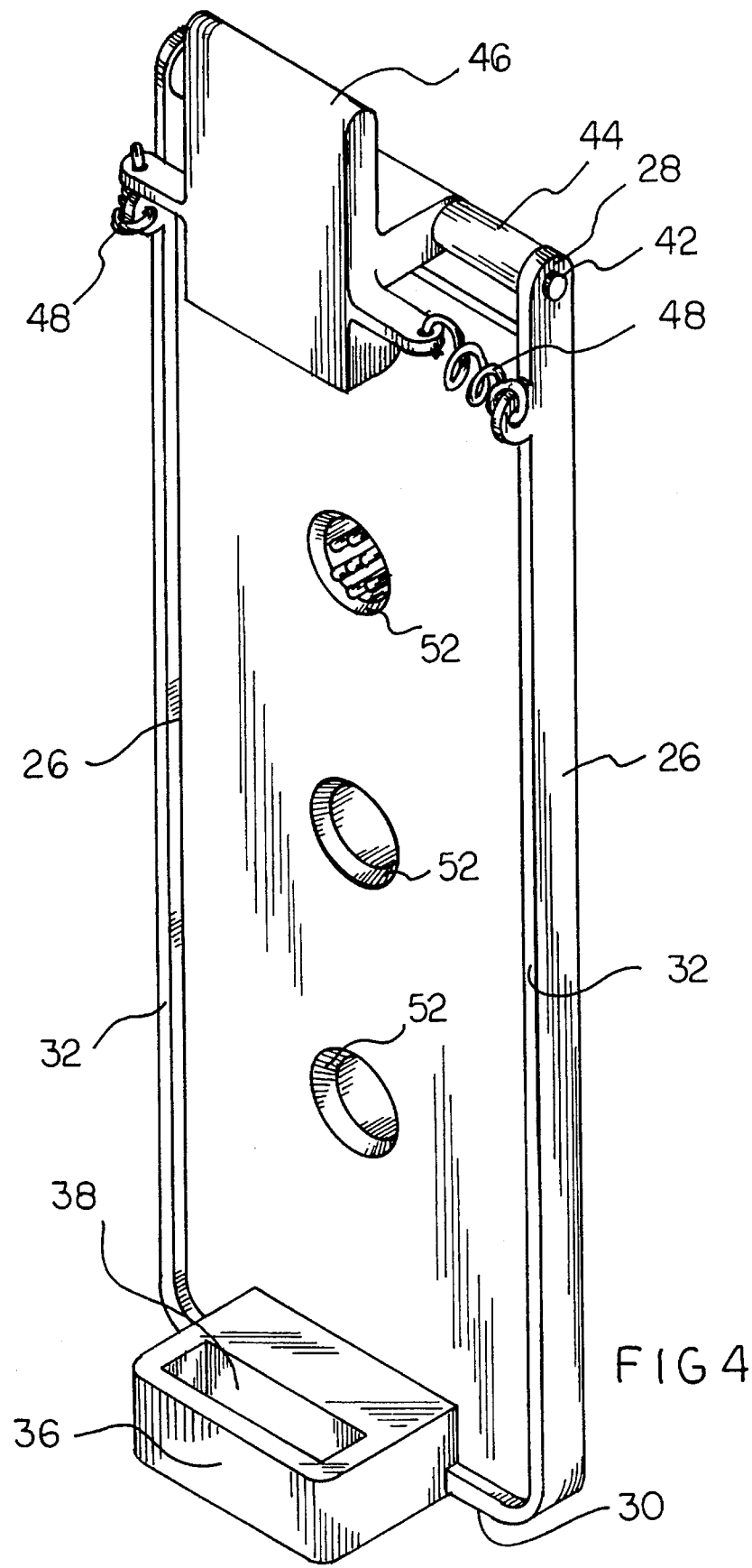
FIG. 4 is a perspective illustration of the trailer plate shown in FIG. 1.
Figure 5:
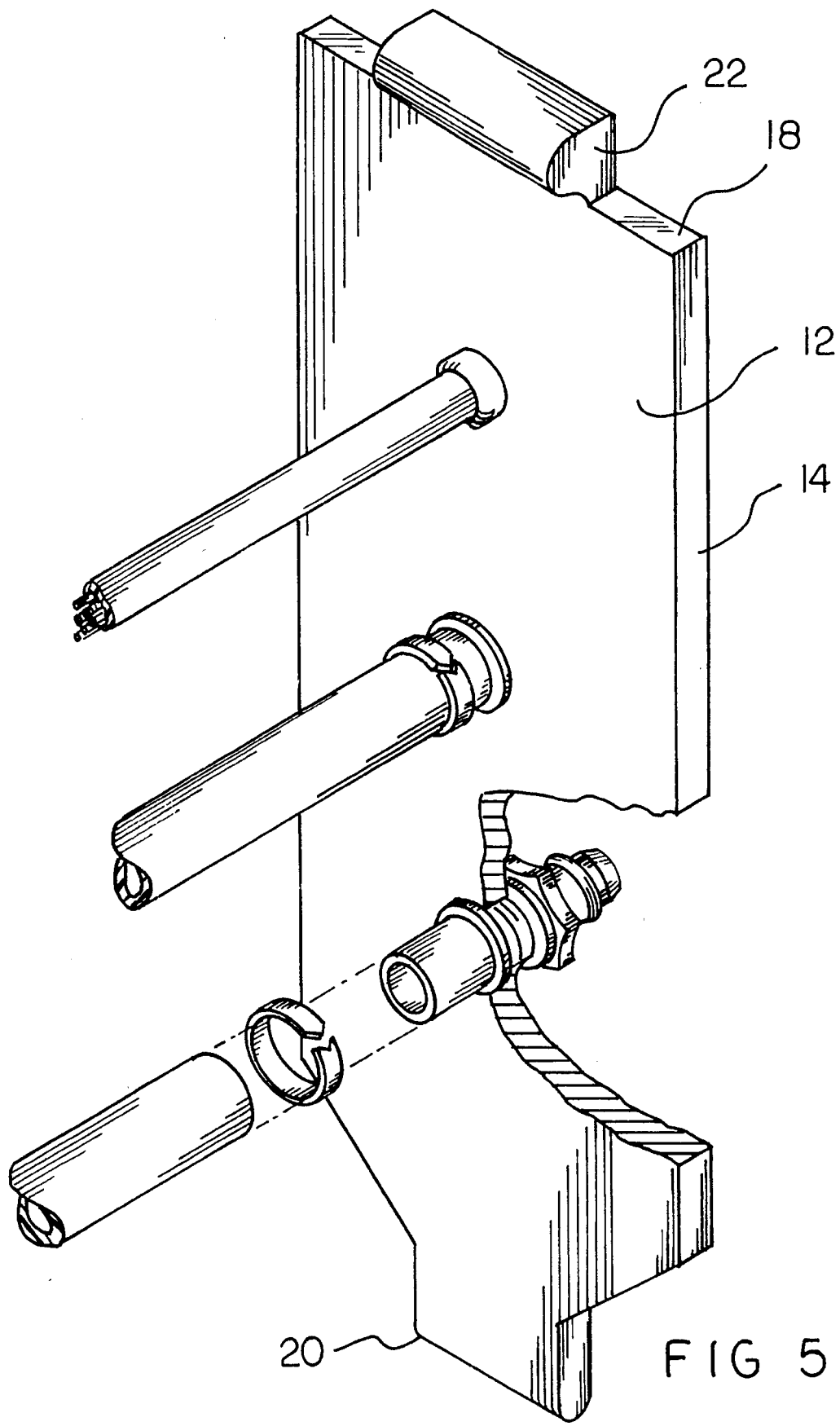
FIG. 5 is an enlarged perspective view of the tractor plate shown in FIGS. 1 and 2.

With reference now to the drawings, and in particular to FIG. 1 thereof, the preferred embodiment of the new and improved apparatus for the coupling of lines between a tractor and a trailer embodying the principles and concepts of the present invention and generally designated by the reference numeral 10 will be described.

The present invention, the new and improved apparatus for the coupling of lines between a tractor and a trailer, is a system comprised of a plurality of components. Such components, in their broadest context, include a tractor plate, apertures therethrough, a trailer plate, apertures therethrough, spring securement means and a plurality of fittings. Such components are individually configured and correlated with respect to each other so as to attain the desired objectives.

The central component of the present system 10 is a tractor plate 12. Such tractor plate is formed in a generally rectangular configuration with parallel side edges 14. Such side edges extend vertically when, in the operative orientation, the tractor plate is secured to the rear face of a tractor 16. The tractor plate also has an upper edge 18 and a lower edge 20 parallel with respect to each other and extending in a horizontal orientation. The upper edge has an upwardly extending enlarged head 22.

Formed in the tractor plate are a plurality of aligned apertures. Such apertures are preferably centrally located with their axis in a horizontal orientation and in vertical alignment. Such apertures extend all the way through the tractor plate.

Next provided is a trailer plate in a rectangular configuration with its vertically extending parallel side walls 26. It has generally parallel upper and lower edges 28 and 30. Flanges 32 extend forwardly from the side edges of the trailer plate. They are adapted to receive the side edges of the tractor plate.

The trailer plate also includes an enlargement 36 with a recess 38 at its lower edges. Such recess is adapted for receiving the tongue of the tractor plate for the support thereof when the two plates are in operative face to face relationship.

In addition, the flanges of the trailer plate have apertures 42 in a horizontal alignment adjacent the upper edge of the trailer plate. A pivot pin 44 extends through the apertures in a horizontal orientation. A retainer block 46 is supported for pivotal movement by the pivot pin. The retainer block is adapted to receive and support the enlarged head of the tractor plate at the upper edge of the tractor plate and hold it secure during operation and use. The spring 48 holds the retainer block in position. The retainer block may be pulled away by a user against the urging of the spring.

Formed in the trailer plate are a plurality of vertically aligned apertures 52. Three such apertures are provided with horizontal axes vertically aligned one above the other. Such apertures are adapted to be aligned with the apertures of the tractor plate during operation and use.

Springs 48 are secured to the retainer block of the trailer plate. Such springs are adapted to hold the head and its associated tractor plate in position one with respect to the other with the apertures of the plates in alignment during operation and use.

Next provided are a plurality of fittings. The first set of fittings 52 are adapted to hold the rearward edges 54, 56 and 58 of an electrical line 60, an emergency line 62 and a service line 64. Such three lines are conventional lines found in tractors to convey activities such as electrical power, emergency brake and service electricity. Such are conventional in the art for the combination of a tractor and a trailer.

Such fittings function to hold the appropriate ends of the lines in position within the tractor plate. Such fittings are provided with frusto-conically shaped exterior surfaces 66. Such fittings extend rearwardly from the rear surface of the tractor plate. The last component of the system is the fittings 68 for the lines of the trailer and trailer plate. Such fittings include apertures with frusto-conical shapes. Such shaped apertures are for the removable receipt of the frusto-conically shaped projections of the fittings of the tractor plate. In this manner, when the tractor plate is releasably coupled to the trailer plate, a safe secure coupling is made between the tractor plate and the trailer plate and the associated lines therebetween.

When truckers connect the tractor and trailer they must connect three separate lines between the two: a seven-way electrical plug; an emergency line; and a service line. If they fail to properly connect all three, one or more of the lines may be damaged when the vehicle is driven. Wiring may be pulled loose, or the air lines may even be damaged. Currently air line connections on trailers extend out where they are easily damaged. Problems can also occur when the drive disconnects the hookups. For instance, because it is sometimes difficult to remove the electrical connection, the driver may pull or yank on the line behind the plug and break the wires. The present invention is a new device designed to allow the driver to attach and disconnect all three of these lines simultaneously in a safer and more secure way.

The present invention consists of an aluminum cover panel and a connector panel each about six inches long. All three of the systems which the driver must connect are fed from the trailer into the connector panel which is mounted on the front of the trailer. The connections from the tractor to the trailer are mounted on the cover panel. The front side of the panel has three connectors on it. The back of the panel has two connectors and seven electrical contacts. It is attached over the front of the connector panel by means of a slotted hinge at the bottom and a spring loaded clip at the top. This design feature ensures that the panel is securely attached to the trailer and that if a problem occurs the cover panel will simply snap off without damaging the wires and connectors. The design of the present invention not only ensures a cleaner and quicker connection, but it also protects the connection. An adaptor version of the present invention could be made for use with older style trailers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An apparatus for the coupling of lines between a tractor and a trailer comprising, in combination:

a tractor plate formed in a generally rectangular configuration with parallel side edges extending vertically and with a lower edge having a downwardly extending tongue and an upwardly extending enlarged head;

three vertically aligned apertures formed in the tractor plate;

a trailer plate in a generally rectangular configuration having vertically extending parallel side edges and generally parallel upper and lower edges, flanges extending forwardly from the side edges thereof adapted to receive the side edges of the tractor plate, the trailer plate also including an enlargement with a recess at its lower edge adapted to receive the tongue of the tractor plate for the support thereof, the flanges of the trailer plate having apertures at the upper edge thereof with a pivot pin extending therethrough, a retainer block supported by the pivot pin adapted to receive and support the head at the upper edge of the tractor plate during operation and use;

a plurality of vertically aligned apertures in the trailer plate in axial alignment with the apertures of the tractor plate;

springs secured to the retainer block of the trailer plate adapted to hold the head and its associated tractor plate in position during operation and use;

fittings to hold the rearward edge of an electrical line, emergency line and service line of a tractor in position in the tractor plate with frusto-conically shaped exterior surfaces extending from the rear surface of the tractor plate; and fittings for lines of the trailer plate including frusto-conically shaped apertures for the receipt of the frusto-conically shaped projections of the tractor plate whereby when the tractor plate is releasably coupled to the trailer plate, a safe secure coupling is made between the tractor plate and trailer plate and the lines therebetween.

2. An apparatus for the coupling of lines between a tractor and a trailer comprising:

a tractor plate formed in a generally rectangular configuration with parallel side edges extending vertically and with a lower edge having a downwardly extending tongue and an upwardly extending enlarged head;

three of vertically aligned apertures formed in the tractor plate;

a trailer plate in a generally rectangular configuration having vertically extending parallel side edges and generally parallel upper and lower edges, flanges extending forwardly from the side edges thereof adapted to receive the side edges of the tractor plate, the trailer plate also including an enlargement with a recess at its lower edge, the recess congruently shaped with respect to the tongue of the tractor plate adapted to receive the tongue of the tractor plate for the support thereof, the flanges of the trailer plate having apertures at the upper edge thereof with a pivot pin extending therethrough, a retainer block supported by the pivot pin adapted to receive and support the head at the upper edge of the tractor plate during operation and use;

a plurality of vertically aligned apertures formed in the trailer plate in axial alignment with the apertures of the tractor plate; and springs secured to the retainer block of the trailer plate adapted to hold the head and its associated tractor plate in position during operation and use.

3. The apparatus as set forth in claim 2 and further including fittings to hold the rearward edge of an electrical line, emergency line and service line of a tractor in position in the tractor plate with frusto-conically shaped exterior surfaces extending from the rear surface of the tractor plate.

4. The apparatus as set forth in claim 2 and further including fittings for lines of the trailer plate including frusto-conically shaped apertures adjacently aligned with the vertically aligned apertures of the trailer plate.

* * * * *